June 29, 1954     R. E. ULRICH     2,682,250
AIR FILTER SIGNAL
Filed April 25, 1950

INVENTOR.
ROY E. ULRICH

BY
*Wm. H. Dean*

AGENT

Patented June 29, 1954

2,682,250

UNITED STATES PATENT OFFICE 2,682,250

AIR FILTER SIGNAL

Roy E. Ulrich, La Jolla, Calif.

Application April 25, 1950, Serial No. 157,991

8 Claims. (Cl. 116—112)

My invention relates to an air filter signal, more particularly for use in connection with forced draught heating systems, wherein the clogged condition of the air filter therein causes operation of the signal, and the objects of my invention are:

First, to provide an air filter signal of this class which may be used in connection with conventional forced draught heating equipment for providing a whistle signal when the air filter of the heating system affords considerable resistance to the passage of air, due to its loaded condition;

Second, to provide an air filter signal of this class which operates at extremely low pressures and velocities;

Third, to provide an air filter signal of this class which is readily adjustable for signal operation at a certain velocity and pressure level, as desired;

Fourth, to provide an air filter signal of this class which insures clean, healthful condition of air which circulates through a forced air heating system of conventional arrangement;

Fifth, to provide an air filter signal of this class which is very simple and easy to install in connection with various forced air heating sysems;

Sixth, to provide an air filter signal of this class which is readily and easily adjusted within its grommet support for operation at a predetermined velocity of air therethrough; and Seventh, to provide an air filter signal of this class which is very simple and economical of construction, efficient in operation, and which will not readily deteriorate or get out of order.

Figure 1:
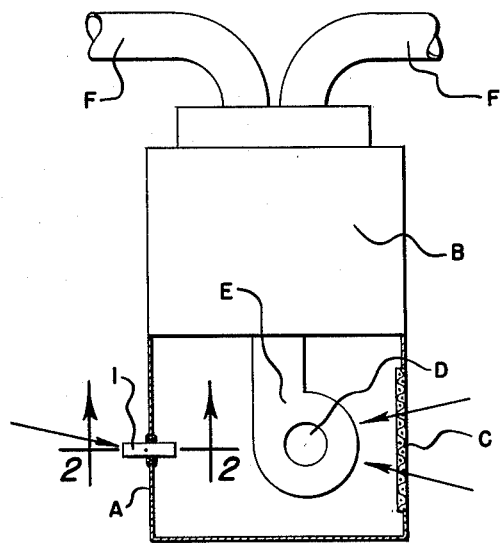
Figure 2:
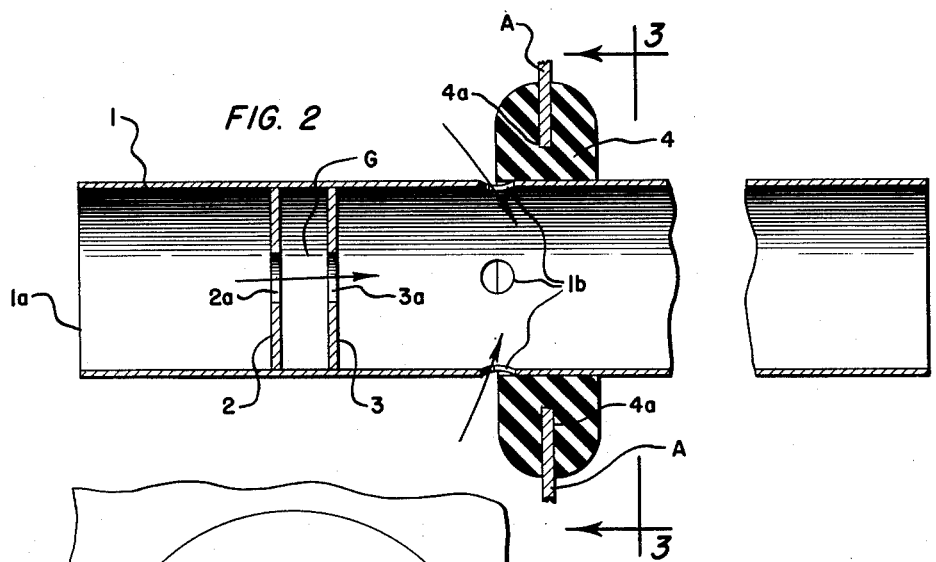
Figure 3:
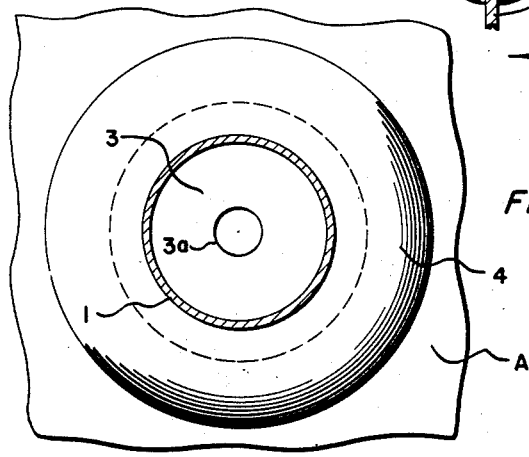

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, forming a part of this application, in which:

Fig. 1 is a side elevational view of a conventional forced air heating apparatus, showing portions thereof broken away and in section to amplify the illustration, and showing my air filter signal in connection therewith, illustrating a part thereof in section; Fig. 2 is an enlarged sectional view, taken from the line 2—2 of Fig. 1, showing a portion of the forced air heating apparatus casing in connection with my air filter signal; and Fig. 3 is a sectional view, taken from the line 3—3 of Fig. 2.

Similar characters of reference refer to similar parts and portions throughout the several views of the drawings.

The tube 1, baffles 2 and 3, and the grommet 4, constitute the principal parts and portions of my air filter signal.

The tube 1 is a hollow cylindrical member, as shown in Fig. 2 of the drawings, and fixed therein are the spaced disc-shaped baffles 2 and 3, which are provided with concentric openings 2a and 3a, within the tube 1. These baffles 2 and 3 are slightly spaced relative to each other and spaced from the inlet end 1a of the tube 1. Inwardly of the baffle 3 from the inlet end 1a of the tube 1, said tube 1 is provided with an annular row of secondary openings 1b, which may be adjacent to the grommet 4 or partially covered thereby, in accordance with the required adjustment.

The grommet 4 is preferably of resilient material and is a conventional grommet, having an annular groove 4a which is adapted to engage the sheet metal A of the forced air heating apparatus B, shown in Fig. 1 of the drawings. The sheet metal A constitutes a side wall of the inlet casing in which the conventional filter C is positioned. The intake D of the centrifugal blower E normally draws air through the filter C, and outwardly through the heating tubes F.

The operation of my air filter signal is substantially as follows:

When the tube 1 is adjusted within the grommet 4 longitudinally of its axis, so that the secondary openings 1b are partially covered, in accordance with the required adjustment, the velocity passing through the openings 2a and 3a in the baffles 2 and 3, as indicated by the arrow G, is insufficient to cause the signal to whistle. However, when the filter C becomes considerably clogged with foreign matter, and the blower E continues to operate and force air into the inlet D, velocity through the openings 2a and 3a in the baffles 2 and 3 increases, causing my air filter signal to whistle.

When the audible whistle is heard, the owner of the forced draught heating system B is warned that the filter C is loaded with foreign matter and should be cleaned or replaced. In order to adjust the tube 1 of my air filter signal, to operate the whistle thereof at a certain velocity as indicated by the arrow G through the orifices 2a and 3a in the baffles 2 and 3, the tube 1 may be slidably adjusted longitudinally in the grommet 4, so that a certain portion of the openings 1b provides by-pass inlet through the tube 1 and into the casing of the forced air heating apparatus B, as shown in Fig. 1 of the drawings.

It will be noted that when the openings 1b in the tube 1 are exposed to their fullest extent, an allowance is made for extreme loading of the filter C before the audible whistle is heard through the openings 2a and 3a in the baffles 2 and 3. This is due to the fact that the openings 1b provide an inlet through the tube 1 independently of the openings 2a and 3a, so that greater resistance to the passage of air through the filter C is occasioned before the whistle is heard through the openings 2a and 3a.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a filter signal of the class described, a hollow tubular member, baffle means therein having axial openings therethrough, and secondary openings in the side wall of said tubular member, and a supporting collar outwardly of said tubular members for partially covering said second mentioned openings and comprising a support for the member.

2. In a signal of the class described, a hollow tubular member, baffles in said hollow tubular member having openings therein, said hollow tubular member having a plurality of secondary openings in the side wall thereof and spaced from said baffle means, and a supporting collar positioned in surrounding relation with said tube and wherein said member is slidable to adjustably restrict the area of said secondary openings, said collar comprising a support for the member.

3. In a signal of the class described, a hollow tubular member, baffles in said hollow tubular member having openings therein, said hollow tubular member having a plurality of secondary openings in the side wall thereof and spaced from said baffle means, and a supporting collar positioned in surrounding relation with said tube and wherein said member is slidable to adjustably restrict the area of said secondary openings, said collar comprising a support for the member, said baffle means being spaced from each other and spaced from said secondary openings.

4. In a signal of the class described, a hollow tubular member, baffles in said hollow tubular member having openings therein, said hollow tubular member having a plurality of secondary openings in the side wall thereof and spaced from said baffle means, and a supporting collar positioned in surrounding relation with said tube and wherein said member is slidable to adjustably restrict the area of said secondary openings said collar comprising a support for the member, said baffle means being spaced from each other and spaced from said secondary openings, said secondary openings arranged in an annular row in the outer wall of said tubular member.

5. In a signal of the class described, a hollow tubular member, baffle means therein having concentric openings therethrough, said tube having a secondary opening in the side wall thereof, spaced from said baffle means, and means surrounding said tube said tube being slidable axially of the last mentioned means for restricting said secondary opening, said last-mentioned means comprising a resilient grommet structure having an annular groove in the periphery thereof adapting said grommet to be supported in an opening in a sheet metal member.

6. In a signal of the class described, a hollow tubular member, baffle means therein having concentric openings therethrough, said tube having a secondary opening in the side wall thereof, spaced from said baffle means, and means surrounding said tube said tube being slidable axially of the last mentioned means for restricting said secondary opening, said last-mentioned means comprising a resilient grommet structure having an annular groove in the periphery thereof adapting said gromet to be supported in an opening in a sheet metal member, said baffle means being spaced from one end of said tubular member and said secondary opening being on the opposite side of said baffle means.

7. An air conditioner casing, a blower operatively mounted to draw air out of said casing, an air inlet to said casing having a filter mounted therein, and a whistle in the side wall of said casing adapted to provide an air passage into said casing through which the velocity of air increases when said filter becomes restricted with foreign matter, whereby said whistle operates when said filter causes restriction of flow of air into said casing to said blower.

8. An air conditioner casing, a blower inside said casing, an inlet to said casing having a filter imposed therein, and a whistle in the side wall of said casing adapted to provide an air passage into said casing through which the velocity of air increases when said filter becomes restricted with foreign matter, whereby said whistle operates when said filter causes restriction of flow of air into said casing to said blower, said whistle of tubular construction and having a plurality of holes therein, and a grommet in the side wall of said casing in which said tube of said whistle is slidable for adjusting the area of said holes outwardly of said grommet in order to provide a predetermined setting for said whistle, so that it will operate at a predetermined velocity therethrough.

References Cited in the file of this patent

UNITED STATES PATENTS

| Number | Name | Date |
| --- | --- | --- |
| 471,015 | Nessle | Mar. 15, 1892 |
| 976,008 | Terwilliger | Nov. 15, 1910 |
| 992,487 | Ellison | May 16, 1911 |
| 1,397,263 | Carmody | Nov. 15, 1921 |
| 1,558,934 | Sherrill | Oct. 27, 1925 |
| 1,779,795 | Backstatter | Oct. 28, 1930 |
| 1,811,853 | Landman | June 30, 1931 |
| 2,172,399 | Mueller | Sept. 12, 1939 |
| 2,270,318 | Leathers | Jan. 20, 1942 |
| 2,485,142 | Duncan | Oct. 18, 1949 |
| 2,493,164 | Rose | Jan. 3, 1950 |
| 2,507,934 | Reichart | May 16, 1950 |

FOREIGN PATENTS

| Number | Country | Date |
| --- | --- | --- |
| 421,030 | France | Oct. 3, 1910 |